(12) United States Patent
Showa et al.

(10) Patent No.: US 10,476,340 B2
(45) Date of Patent: Nov. 12, 2019

(54) SPINDLE MOTOR

(71) Applicant: Minebea Mitsumi Inc., Nagano (JP)

(72) Inventors: Hideaki Showa, Kitasaku-gun (JP); Daigo Nakajima, Tomi (JP)

(73) Assignee: MINEBEA MITSUMI INC., Nagano (JP)

( * ) Notice: Subject to any disclaimer, the term of this patent is extended or adjusted under 35 U.S.C. 154(b) by 29 days.

(21) Appl. No.: 15/791,465

(22) Filed: Oct. 24, 2017

(65) Prior Publication Data

US 2018/0123417 A1 May 3, 2018

(30) Foreign Application Priority Data

Oct. 27, 2016 (JP) .................. 2016-210362

(51) Int. Cl.
*H02K 3/38* (2006.01)
*G11B 19/20* (2006.01)
*H02K 5/173* (2006.01)

(52) U.S. Cl.
CPC ............ *H02K 3/38* (2013.01); *G11B 19/20* (2013.01); *H02K 5/1737* (2013.01); *H02K 2213/03* (2013.01)

(58) Field of Classification Search
CPC ........ G11B 19/20; H02K 3/38; H02K 5/1737; H02K 2213/03

USPC .................................................. 310/67 R
See application file for complete search history.

(56) References Cited

U.S. PATENT DOCUMENTS

| 5,969,448 A | * | 10/1999 | Liu | ............ | F16C 17/105 |
| | | | | | 310/67 R |
| 2001/0045782 A1 | * | 11/2001 | Lieu | ............ | G11B 19/2009 |
| | | | | | 310/67 R |
| 2007/0216239 A1 | * | 9/2007 | Horng | ............ | G11B 17/028 |
| | | | | | 310/67 R |

FOREIGN PATENT DOCUMENTS

JP      2008-275125 A    11/2008

* cited by examiner

*Primary Examiner* — Naishadh N Desai
(74) *Attorney, Agent, or Firm* — Pearne & Gordon LLP

(57) ABSTRACT

A spindle motor includes a base plate to which a shaft is fixed, an annular stator core that is fixed to the base plate and is wound with a plurality of stator coils, and a rotor member that is attached in a rotatable state to the shaft and includes an inner sleeve portion facing an inner peripheral side of the stator core with an inner clearance and an outer sleeve portion facing an outer peripheral side of the stator core with an outer clearance, an annular groove is formed on an outer periphery of the inner sleeve portion, and the annular groove overlaps with the plurality of stator coils as viewed from a direction perpendicular to the shaft.

3 Claims, 5 Drawing Sheets

SPINDLE MOTOR

CROSS-REFERENCE TO RELATED APPLICATIONS

This application is based upon and claims the benefit of priority of Japanese Patent Application No. 2016-210362 filed on Oct. 27, 2016, the contents of which are incorporated herein by reference in its entirety.

BACKGROUND OF THE DISCLOSURE

1. Field of the Invention

The present disclosure relates to a shaft-fixed type spindle motor, and more particularly to a structure for preventing contact between a crossover wire of a stator coil and a rotor.

2. Description of the Related Art

A shaft-fixed type spindle motor used for driving a hard disk drive is known (for example, see JP-A-2008-275125).

In the related art, a spindle motor has a structure in which an annular stator core is provided and the stator core has a plurality of pole teeth (salient poles) arranged in a circumferential direction at the outside thereof. These pole teeth are wound with stator coils, and the stator coils are connected to each other by crossover wires in a specific relation. Here, a tip portion extending in the circumferential direction is provided on an outer peripheral side (tip side) of the salient pole, and the crossover wires are led out on an inner peripheral side of the stator core.

In the structure disclosed in JP-A-2008-275125, a sleeve of a rotor is close to the stator core located at the outside thereof. In this structure, there is a concern that the crossover wires described above may contact the rotor. Certainly, the crossover wires are led out or connected in a manner to avoid such a problem, but there may be a case where the contact between the crossover wires and the rotor occurs due to loosening of the wires during use.

SUMMARY OF THE INVENTION

One of objects of the present disclosure is to provide a spindle motor having a structure for preventing interference between the crossover wires of the stator coil and the rotor in the shaft-fixed type spindle motor.

The present disclosure is to provide a spindle motor including: a base member to which a shaft is fixed; an annular stator core that is fixed to the base member and is wound with a plurality of stator coils; and a rotor that is attached in a rotatable state to the shaft and includes an inner sleeve portion facing an inner peripheral side of the stator core with an inner clearance and an outer sleeve portion facing an outer peripheral side of the stator core with an outer clearance, wherein an annular groove is formed on an outer periphery of the inner sleeve portion, and wherein the annular groove overlaps with a portion where crossover wires connecting the plurality of stator coils are led out, as viewed from a direction perpendicular to the shaft.

In the present disclosure, it is preferable that, as viewed from the direction perpendicular to the shaft, the annular groove partially overlaps with the stator core. In the present disclosure, further, it is preferable that the inner sleeve portion includes a first reduced diameter portion having a first outer radius and serving as the annular groove, an enlarged diameter portion having a second outer radius larger than the first outer radius which is adjacent to the first reduced diameter portion, the enlarged diameter portion facing the stator core, and a second reduced diameter portion having a third outer radius smaller than the first outer radius which is adjacent to the enlarged diameter portion and sandwiches the enlarged diameter portion with the first reduced diameter portion, and wherein a sealing member is fixed to the second reduced diameter portion to seal a lubricant filling a gap between the shaft and the rotor.

According to the present disclosure, it is possible to prevent interference between the crossover wires of the stator coil and the rotor in the shaft-fixed type spindle motor.

DETAILED DESCRIPTION

Figure 1:
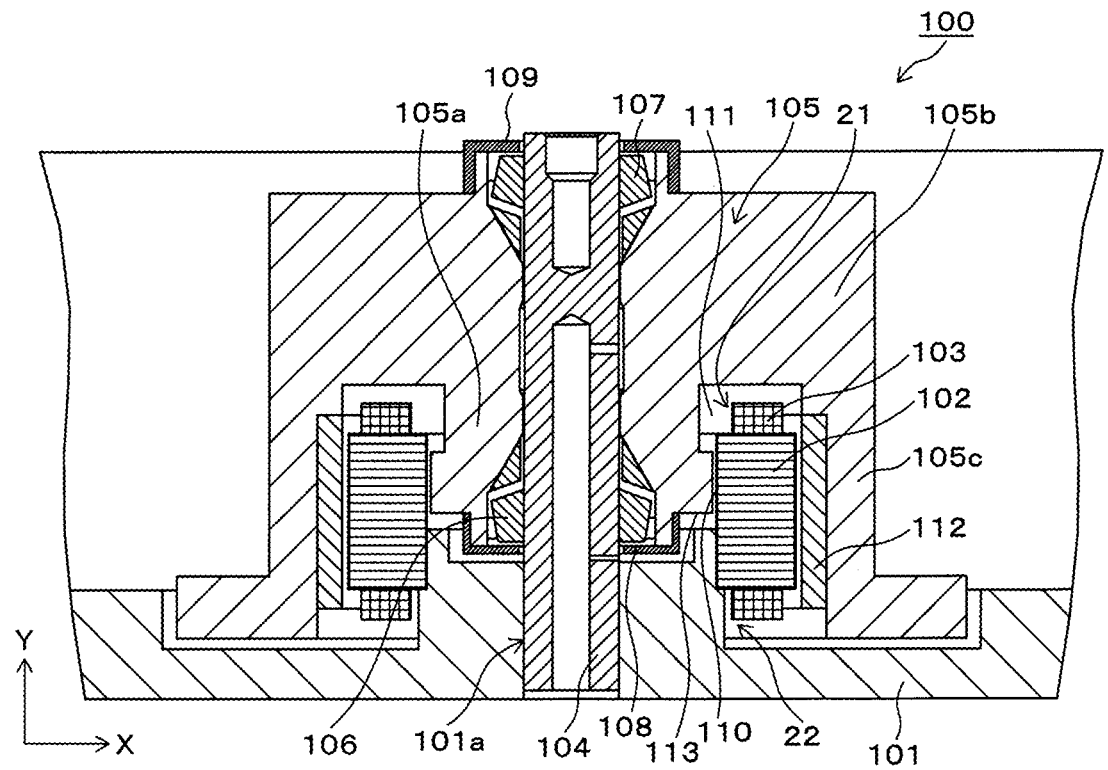
FIG. 1 is a sectional view of a spindle motor according to an embodiment.

FIG. 1 illustrates a spindle motor 100. FIG. 1 illustrates a section taken along a plane including a rotational axis. The spindle motor 100 includes a base plate 101 constituting a part of a casing. The base plate 101 is made of metal (for example, an aluminum alloy). A stator core 102 having an annular shape is fixed to the base plate 101.

The stator core 102 has a structure in which a plurality of annular soft magnetic material sheets (for example, electromagnetic steel sheets) are stacked in an axial direction. The stator core 102 includes a plurality of pole teeth (salient poles) that are disposed along a circumferential direction and extend radially outward. A stator coil 103 serving as a driving coil is wound around each of the pole teeth. The axis herein coincides with a rotation center of a rotor member 105 and a center axis of a shaft 104. In the following description, a direction parallel to the center axis of the shaft (axial direction) may be referred to as "Y-axis direction", and a direction perpendicular to the center axis of the shaft (radial direction) may be referred to as "X-axis direction".

Figure 2:
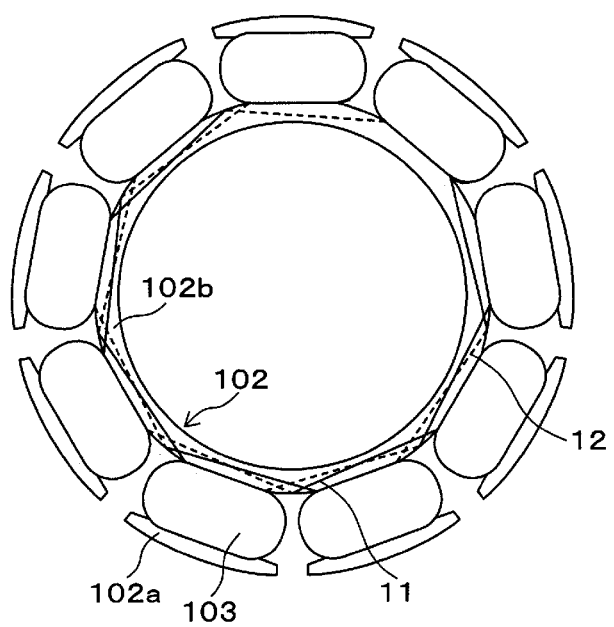
FIG. 2 is a top view of a stator core in a state where a stator coil is wound as viewed from an axial direction.

FIG. 2 illustrates the stator core 102 in FIG. 1 viewed from the positive side to the negative side of the Y-axis direction. As illustrated in FIG. 2, the annular stator core 102 includes an annular portion 102b and a plurality of pole teeth 102a that protrude radially outward from an outer periphery of the annular portion 102b. FIG. 2 illustrates a state where the stator coils 103 are wound around each of the pole teeth 102a, respectively.

As illustrated in FIG. 2, the plurality of stator coils 103 are connected to each other by crossover wires indicated by solid lines 11 and broken lines 12. Here, the solid line 11 indicates the crossover wire led out on the front side (positive side of Y-axis) of the annular stator core 102, and the broken line 12 indicates the crossover wire led out on the back side (negative side of Y-axis) of the annular stator core 102. The crossover wires denoted by reference numerals 11 and 12 are led out along the annular portion 102b on an inner diameter side of the stator core 102 (near annular space indicated by reference numerals 21 and 22 in FIGS. 1 and 3).

A hole 101*a* in the axial direction is provided at the base plate 101. The shaft 104 made of metal is fixed inside the hole 101*a*. The shaft 104 holds the rotor member 105 in a rotatable state. The rotor member 105 includes an inner sleeve portion 105*a* having substantially cylindrical shape, a disk portion 105*b* that extends radially outward and has a disk shape, and an outer sleeve portion 105*c* that extends in the axial direction from an outer edge of the disk portion 105*b* and has a cylindrical shape. For example, in the case of a hard disk drive, a magnetic disk is disposed outside the disk portion 105*b* and the outer sleeve portion 105*c*.

The rotor member 105 is formed of, for example, ferrite-based stainless steel which is a magnetic material. In addition, it is also possible to form the inner sleeve portion 105*a* as an individual member, to configure the rotor member 105 from a combination of a plurality of members. Further, the rotor member 105 can also be made of an aluminum alloy.

A hole is provided at the center (a part corresponding to the rotational center) of the rotor member 105 passing through the rotor member 105 in the axial direction. The shaft 104 is inserted in the hole, and the rotor member 105 is held in a rotatable state with respect to the shaft 104 by a pair of conical bearing members 106 and 107 fixed to both ends of the shaft 104. The through hole of the rotor member 105 has a conical inner surface at both ends, whose inner diameter enlarges toward the outside. Each of the conical bearing members 106 and 107 has a conical outer surface facing the conical inner surface of the through hole with a minute gap therebetween. A dynamic pressure groove is formed in at least one of the conical inner surface and the conical outer surface that face each other, thereby forming a fluid dynamic pressure bearing portion.

A minute gap is provided between an inner peripheral surface of the through hole provided at the center of the rotor member 105 and an outer peripheral surface of the shaft 104, and a lubricant (for example, lubricating oil) fills the minute gap. A lubricant also fills the minute gap between the conical inner surface and the conical outer surface described above, and when the rotor member 105 rotates, a dynamic pressure is generated by the dynamic pressure groove and the rotor member 105 rotates in a non-contact state with respect to the shaft 104. In other words, the rotor member 105 rotates around the shaft 104 supported by the fluid dynamic pressure bearing portion. In order to prevent leakage of the lubricant, end caps 108 and 109 serving as sealing members are disposed to cover an opening of the through hole. The end cap 108 is fixed to a second reduced diameter portion 123 (see FIG. 3: which will be described below in detail) in the inner sleeve portion 105*a* of the rotor member 105 by welding combined with press fitting or by bonding combined with press fitting.

Figure 3:
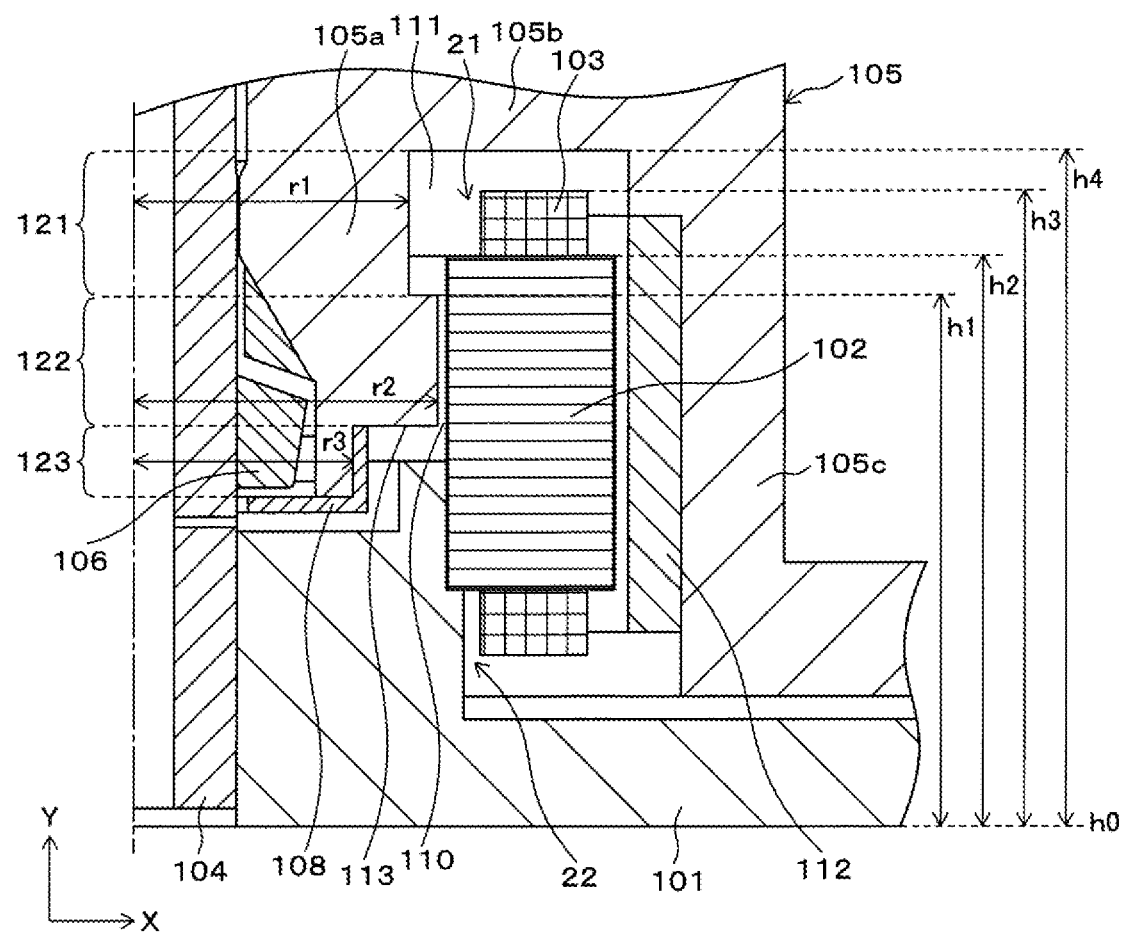
FIG. 3 is an enlarged sectional view illustrating a part of the spindle motor in FIG. 1.

As illustrated in FIG. 3, the inner sleeve portion 105*a* of the rotor member 105 includes, in order from the positive side to the negative side in the Y-axis direction, a first reduced diameter portion 121 having an outer radius r1, an enlarged diameter portion 122 having an outer radius r2 enlarged relative to the outer radius r1 (r2>r1), and the second reduced diameter portion 123 having an outer radius r3 smaller than the outer radius r1 (r2>r1>r3). An upper end position (a position in the Y-axis direction) h4 of the first reduced diameter portion 121 is located above an upper end position (a position in the Y-axis direction) h3 of the stator coil 103, that is, on the positive side in the Y-axis direction (h4>h3). Further, a lower end position (a position in the Y-axis direction) h1 of the first reduced diameter portion 121 is located below an upper end position (a position in the Y-axis direction) h2 of the stator core 102, that is, on the negative side in the Y-axis direction (h1<h2). Here, the positions h1, h2, h3, and h4 are set based on a position h0 of the back surface of the base plate 101.

Figure 6:
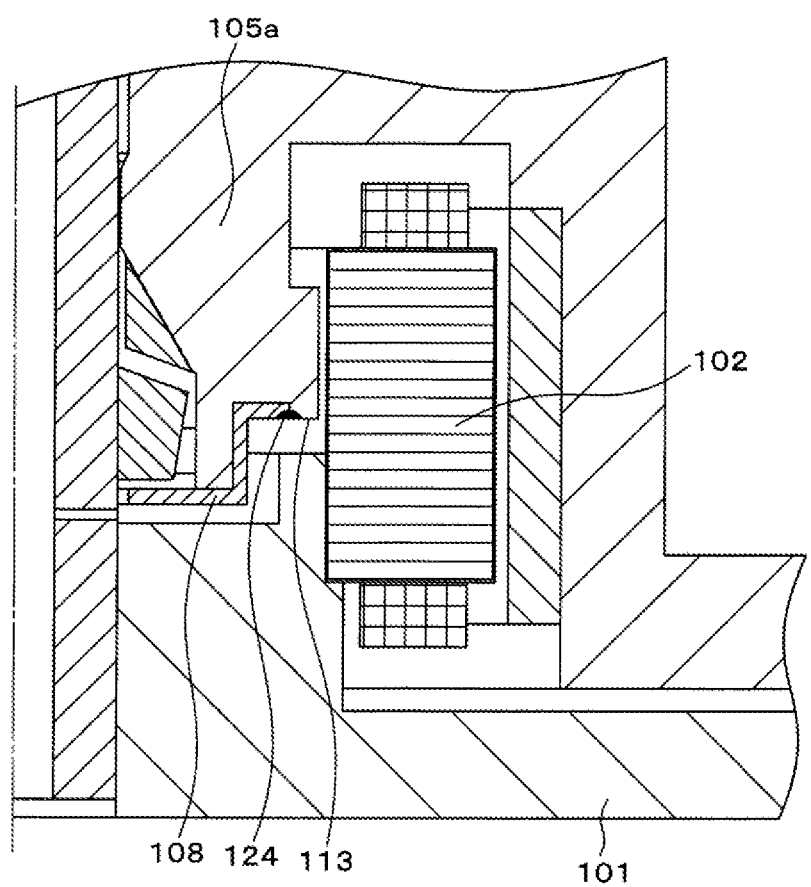
FIG. 6 is a sectional view illustrating an example according to another embodiment.

In the structure illustrated in FIG. 3, the second reduced diameter portion 123 is provided adjacent to the enlarged diameter portion 122, and an annular surface 113 being an annular plane is provided using a step part between the enlarged diameter portion 122 and the second reduced diameter portion 123. Since the annular surface 113 is provided, during an operation of fixing the end cap 108 to the second reduced diameter portion 123 with an adhesive, the adhesive is prevented from dripping in the direction of the stator core 102. Further, when the end cap 108 is fixed to the second reduced diameter portion 123 by welding, it is necessary to bring the tip of a welding machine close to a welding part, and a space is secured at this time by providing the annular surface 113. Further, even when an end cap 108 having a flanged cup shape illustrated in FIG. 6 is fixed to the annular surface 113 at the end of inner sleeve portion 105*a* by welding the flange edge, the annular surface 113 is provided for the purpose of securing a room for weld bead portion 124.

From the view point of preventing the adhesive from dripping or securing the welding space described above, it is preferable to design the annular surface 113 to have a dimension (the width of the annulus) in the radial direction as large as possible. For this reason, a clearance 110 between the outer peripheral surface of the enlarged diameter portion 122 and the inner peripheral surface of the stator core 102 is set not to hinder the rotation of the rotor member 105, and thus the dimension in the radial direction of the annular surface 113 is secured.

If the first reduced diameter portion 121 does not exist and the first reduced diameter portion 121 is also kept to have a radius same as an outer radius of the enlarged diameter portion 122, the outer peripheral surface of the inner sleeve portion 105*a* and the crossover wire of the stator coil 103 led out along the front side of the annular portion 102*b* in the vicinity of the area denoted by reference numeral 21 are brought close to each other, and there is a concern of interference between both of them. On the other hand, in the embodiment of the present disclosure, the first reduced diameter portion 121 having an outer radius r1 is provided in order to prevent interference between the crossover wire and the rotor member 105 (inner sleeve portion 105*a*), and consequently an annular groove 111 is provided in which a space is expanded in the radial direction compared with the case where the first reduced diameter portion 121 is not provided.

Further, as described above, the lower end position (the position in the Y-axis direction) h1 of the first reduced diameter portion 121 is located below the upper end position (the position in the Y-axis direction) h2 of the stator core 102 (h1<h2) so that the first reduced diameter portion 121 partially overlaps with the upper part of the stator core 102 as viewed from the direction perpendicular to the axis (that is, as viewed from the positive side to the negative side in the X-axis direction). That is, as viewed from the direction perpendicular to the axis, part of the annular groove 111 overlaps with the upper part of the stator core 102.

In addition, the dimension in the axial direction (the Y-axis direction) of the first reduced diameter portion 121 is determined such that the upper end position h4 of the first reduced diameter portion 121 is located above the upper end position h3 of the stator coil 103 (h3<h4), that is, the position h4 is defined to locate on the positive side in the Y-axis direction in relation to the position h3.

By providing the annular groove 111 and setting the relation h1<h2 and h3<h4, the space is secured between the crossover wire 11 (see FIG. 2) led out along the front side of the annular portion 102b in the vicinity of the portion indicated by reference numeral 21 and the rotor member 105, thereby a structure preventing the interference between both of them is obtained. That is, since the annular groove 111 is provided, the distance between the outer peripheral surface of the inner sleeve portion 105a (the outer peripheral surface of the first reduced diameter portion 121) and the crossover wire of the stator coil 103 led out in the vicinity of the portion indicated by reference numeral 21 is increased, whereby the interference between both of them is prevented.

The second reduced diameter portion 123 is provided adjacent to the enlarged diameter portion 122. The outer radius r3 of the second reduced diameter portion 123 is set to a value smaller than the outer radius r1 of the first reduced diameter portion 121 (r3<r1), and the dimension in the radial direction of the annular surface 113 is secured. The end cap 108 is attached using the outer peripheral surface and the tip of the second reduced diameter portion 123. As described above, the end cap 108 is fixed to the second reduced diameter portion 123 by bonding combined with press fitting or by welding combined with press fitting.

On the inner side in the radial direction of the outer sleeve portion 105c in the rotor member 105, a rotor magnet 112 is disposed in a state of facing a tip portion of the pole teeth 102a of the stator core 102 with a clearance therebetween. The rotor magnet 112 has an annular shape, and is a permanent magnet magnetized as SNSN . . . in a circumferential direction.

As a drive current supplied to the stator coil 103 is periodically switched in polarity, the magnetic attractive force and the magnetic repulsive force acting between a magnetic force generated by the stator coil 103 and the rotor magnet 112 are periodically switched, and the rotor member 105 rotates with respect to the stator core 102. At this time, since the annular groove 111 is provided, the interference between the crossover wire 11 (see FIG. 2) led out in the portion indicated by reference numeral 21 and the rotor member 105 is prevented.

In particular, since the relation of h1<h2 is set, the space is secured between the upper part of the stator core 102 and the rotor member 105, and the crossover wire is further reliably prevented from coming in contact with the rotor member 105. In addition, since the relation of h3<h4 is set, the space is secured above the stator coil 103, and, for this reason, the crossover wire is also further reliably prevented from coming in contact with the rotor member 105.

As described above, the spindle motor 100 includes the base plate 101 to which the shaft 104 is fixed, the annular stator core 102 that is fixed to the base plate 101 and is wound with the plurality of stator coils 103, and the rotor member 105 that is attached in a rotatable state to the shaft 104 and includes the inner sleeve portion 105a facing the inner peripheral side of the stator core 102 with the clearance therebetween and the outer sleeve portion 105c facing the outer peripheral side of the stator core 102 with the clearance therebetween, the annular groove 111 is formed on the outer periphery of the inner sleeve portion 105a, and the annular groove 111 overlaps with the portion 21 where the crossover wires connecting the plurality of stator coils 103 are led out, as viewed from the direction perpendicular to the axis.

In the above configuration, particularly, as viewed from the direction perpendicular to the axis, the annular groove 111 partially overlaps with the stator core 102. Further, the inner sleeve portion 105a includes the first reduced diameter portion 121 having a relatively reduced outer radius and forming the annular groove 111, the enlarged diameter portion 122 that is adjacent to the first reduced diameter portion 121, has a relatively enlarged outer radius, and faces the stator core 102, and the second reduced diameter portion 123 that is adjacent to the enlarged diameter portion 122, sandwiches the enlarged diameter portion 122 with the first reduced diameter portion 121, and has the outer radius smaller than that of the first reduced diameter portion 121, and the end cap 108 serving as the sealing member is fixed to the second reduced diameter portion 123 to seal the lubricant filled between the shaft 104 and the rotor member 105.

Other Examples

Figure 4A:
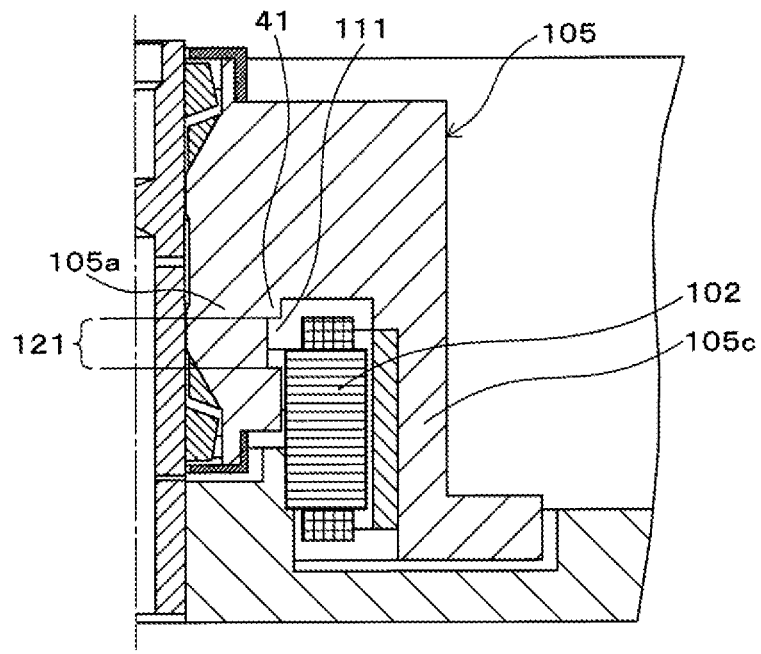
FIGS. 4A and 4B are sectional views illustrating examples according to another embodiment.
Figure 4B:
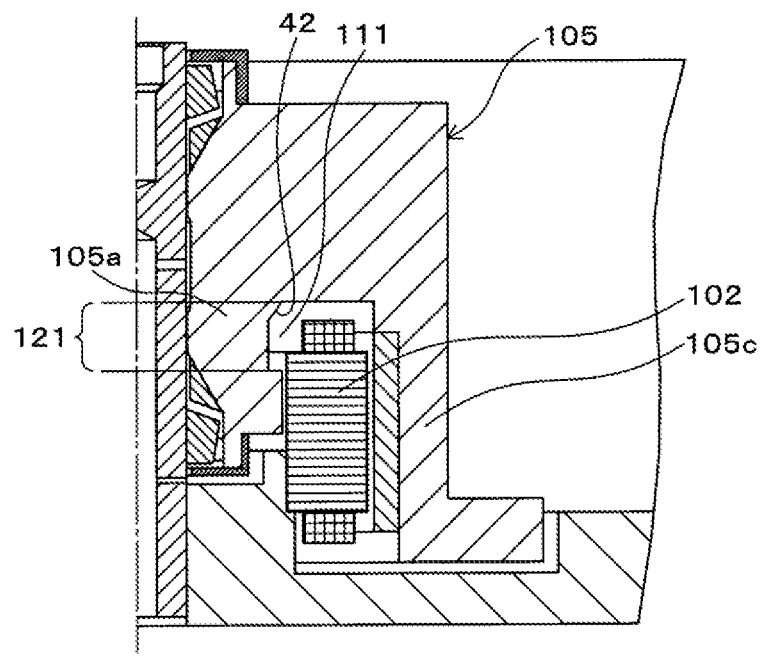
Figure 5A:
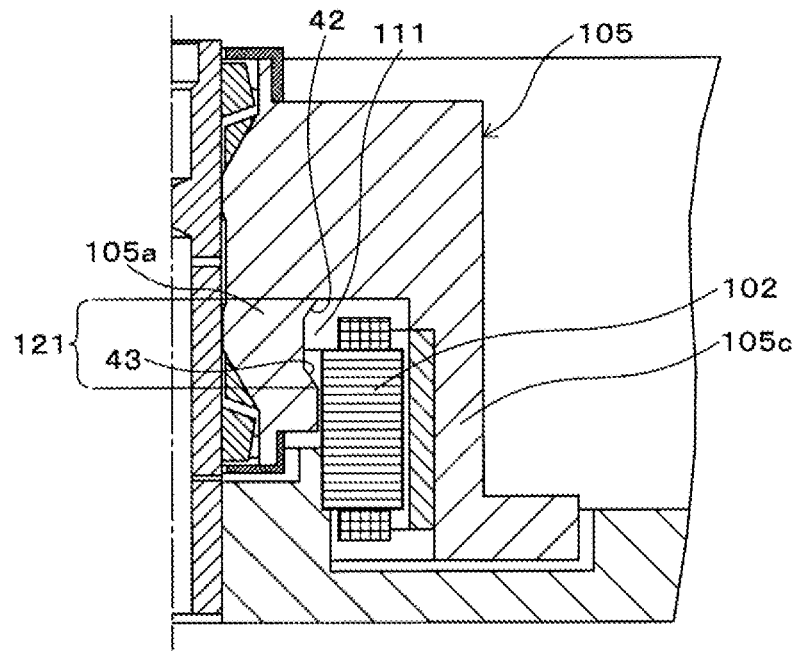
FIGS. 5A and 5B are sectional views illustrating examples according to another embodiment.
Figure 5B:
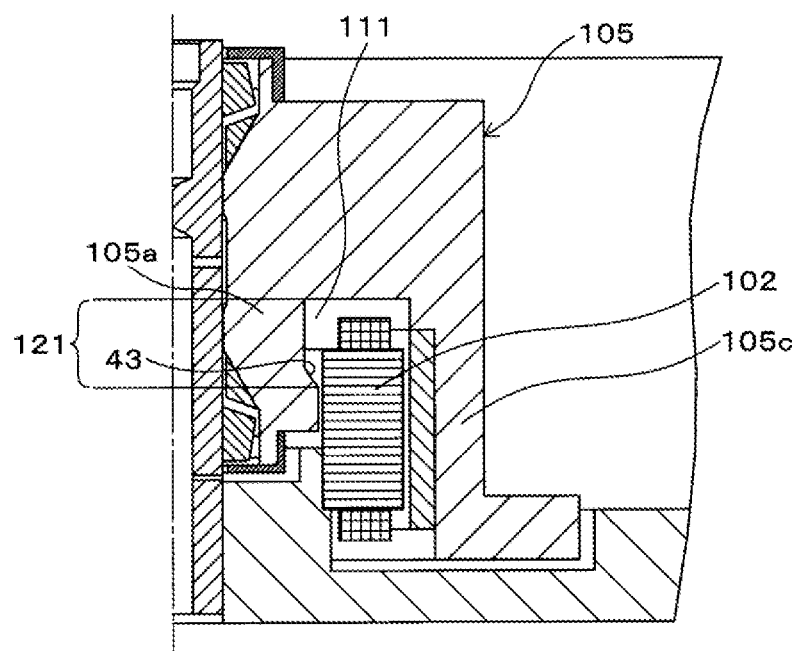

FIG. 4A illustrates an example in which an upper corner of the first reduced diameter portion 121 illustrated in FIG. 3 has a step portion 41. FIG. 4B illustrates an example in which an upper corner of the first reduced diameter portion 121 illustrated in FIG. 3 has a slope portion 42. FIG. 5A illustrates an example in which a lower corner of the first reduced diameter portion 121 in the structure illustrated in FIG. 4B has a slope portion 43. FIG. 5B illustrates an example in which a lower corner of the first reduced diameter portion 121 illustrated in FIG. 3 has a slope portion 43. Further, FIG. 6 illustrates an example in which an end cap having a flanged cup shape is fixed to the annular surface at the end of inner sleeve portion by welding the flange edge.

The present disclosure can be used for a spindle motor. According to the present disclosure, it is possible to prevent interference between the crossover wires of the stator coil and the rotor in the shaft-fixed type spindle motor.

What is claimed is:

1. A spindle motor comprising:
    a base member;
    a shaft fixed to the base member;
    an annular stator core fixed to the base member and wound with a plurality of stator coils; and
    a rotor attached in a rotatable state to the shaft, the rotor including an inner sleeve portion facing an inner peripheral side of the stator core with an inner clearance and an outer sleeve portion facing an outer peripheral side of the stator core with an outer clearance; wherein
    an annular groove is formed on an outer periphery of the inner sleeve portion;
    the annular groove overlaps with a portion where crossover wires connecting the plurality of stator coils are led out, as viewed from a direction perpendicular to the shaft; and
    wherein the inner sleeve portion includes:
        a first reduced diameter portion having a first outer radius and serving as the annular groove;
        an enlarged diameter portion adjacent to the first reduced diameter portion and having a second outer radius larger than the first outer radius, the enlarged diameter portion facing the stator core; and
        a second reduced diameter portion adjacent to the enlarged diameter portion, sandwiching the enlarged diameter portion with the first reduced diameter portion, and having a third outer radius smaller than the first outer radius;

wherein a sealing member is fixed to the second reduced diameter portion to seal a lubricant filling a gap between the shaft and the rotor.

2. The spindle motor according to claim 1,
wherein as viewed from the direction perpendicular to the shaft, the annular groove partially overlaps with the stator core.

3. A spindle motor comprising:
a base member;
a shaft fixed to the base member;
an annular stator core fixed to the base member and wound with a plurality of stator coils; and
a rotor attached in a rotatable state to the shaft, the rotor including an inner sleeve portion facing an inner peripheral side of the stator core with an inner clearance and an outer sleeve portion facing an outer peripheral side of the stator core with an outer clearance; wherein
an annular groove is formed on an outer periphery of the inner sleeve portion;
the annular groove overlaps with a portion where crossover wires connecting the plurality of stator coils are led out, as viewed from a direction perpendicular to the shaft;
wherein as viewed from the direction perpendicular to the shaft, the annular groove partially overlaps with the stator core; and
wherein the inner sleeve portion includes:
a first reduced diameter portion having a first outer radius and serving as the annular groove;
an enlarged diameter portion adjacent to the first reduced diameter portion and having a second outer radius larger than the first outer radius, the enlarged diameter portion facing the stator core; and
a second reduced diameter portion adjacent to the enlarged diameter portion, sandwiching the enlarged diameter portion with the first reduced diameter portion, and having a third outer radius smaller than the first outer radius;
wherein a sealing member is fixed to the second reduced diameter portion to seal a lubricant filling a gap between the shaft and the rotor.

\* \* \* \* \*